(12) United States Patent
Markley et al.

(10) Patent No.: US 11,531,651 B1
(45) Date of Patent: Dec. 20, 2022

(54) DYNAMIC DATA SCHEMA SERVICE

(71) Applicant: Amazon Technologies, Inc., Seattle, WA (US)

(72) Inventors: Tommy Markley, Minneapolis, MN (US); Joseph Eckstrom, Seattle, WA (US); Ian Fedeli, Springfield, IL (US)

(73) Assignee: Amazon Technologies, Inc., Seattle, WA (US)

( * ) Notice: Subject to any disclaimer, the term of this patent is extended or adjusted under 35 U.S.C. 154(b) by 190 days.

(21) Appl. No.: 17/118,462

(22) Filed: Dec. 10, 2020

(51) Int. Cl.
*G06F 16/00* (2019.01)
*G06F 16/21* (2019.01)
*G06F 9/54* (2006.01)

(52) U.S. Cl.
CPC ............ *G06F 16/211* (2019.01); *G06F 9/541* (2013.01)

(58) Field of Classification Search
CPC .............................. G06F 16/211; G06F 9/541
See application file for complete search history.

(56) References Cited

U.S. PATENT DOCUMENTS

| | | | |
|---|---|---|---|
| 2013/0151563 A1* | 6/2013 | Addepalli | H04L 67/10 707/792 |
| 2019/0392006 A1* | 12/2019 | Horowitz | G06F 16/178 |
| 2020/0175030 A1* | 6/2020 | Natraj | G06F 16/953 |
| 2021/0224287 A1* | 7/2021 | Chaudhry | G06N 3/08 |

* cited by examiner

*Primary Examiner* — Tyler J Torgrimson
(74) *Attorney, Agent, or Firm* — Klarquist Sparkman, LLP

(57) ABSTRACT

A dynamic schema service (DSS) stores and vends data schema for use by one or more client services. Each schema includes one or more data fields that describe related entities. The DSS also stores meta-schema, which defines limits for field definitions in the schema and other constraints. Using the DSS, a service owner defines fields and constraints unique to its business application and can revise those fields and constraints over time. When the client service requires a schema, the client service sends a request to the DSS, and the DSS responds with the current version of the schema for use by the client service. Service owners are able to edit their schemas in DSS, and the changes are immediately implemented in the corresponding services by virtue of the schema request to DSS. In some embodiments, the DSS employs a hierarchical graph structure to determine the requested schema.

20 Claims, 10 Drawing Sheets

DYNAMIC DATA SCHEMA SERVICE

BACKGROUND

In existing systems, structure of data is often hard-coded into the system, for example, based on classes or interfaces. The hard-coded data structures are often supplemented with additional code to execute validation of the data. If the data structure or validation needs to be changed, for example, to add data fields to accommodate mutation of the data over time or to cover new requirements, then the underlying code in the system must be modified or rewritten. Users of the system may also want to add custom fields for their data. However, adding custom fields to a hard-coded schema involves substantial effort to rewrite the code, perform software testing, and execute validation. If such additions are required on a frequent basis, this could impact performance, scalability, and/or reliability of the system. Some existing systems are designed to accept custom field additions. However, such systems typically imposes strict limitations on the types fields allowed and generally do not offer flexible custom field management.

DETAILED DESCRIPTION

Figure 1:
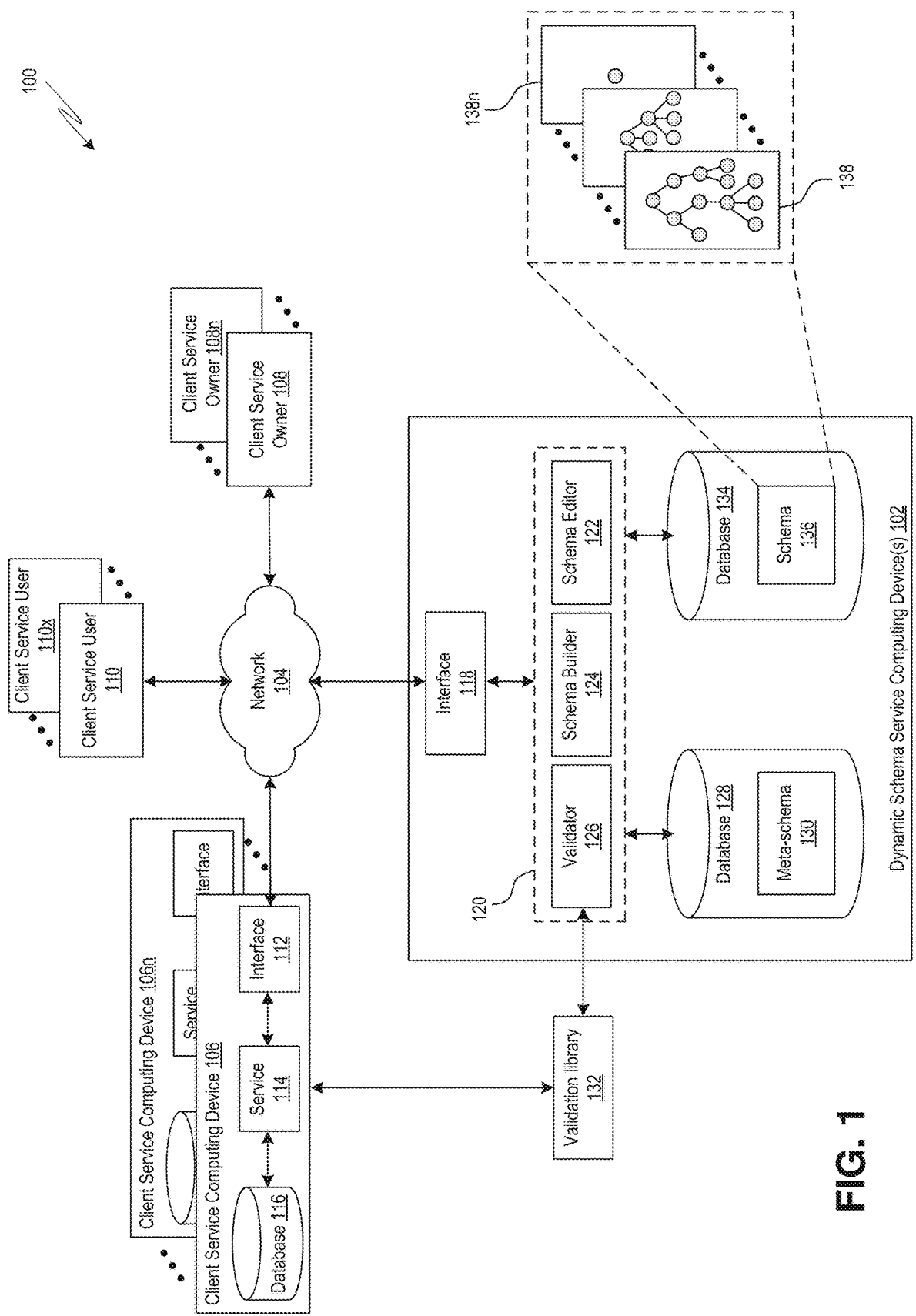
FIG. 1 is a simplified schematic diagram illustrating operation of an exemplary dynamic schema service.

A dynamic schema service (DSS) stores and vends data schema for use by one or more client services or systems. Each schema includes one or more data fields that describe an entity. As used herein, entity refers to any product or item, product type or category, team, department, division, organization, client resource, data element or collection of data elements, or anything else for which schema are used to structure data corresponding thereto. The DSS also stores meta-schema, which defines limits for field definitions in the schema and other constraints. Using the DSS, a service owner defines fields and constraints unique to its business application and can revise those fields and constraints over time, without otherwise having to hard-code the data structures and constraints into the service. Rather, when the client service requires a schema, for example, to display data, generate a report, or accept data input, the client service sends a request to the DSS, and the DSS responds with the current version of the schema for use by the client service. The DSS thus allows service owners to define the fields and constraints that compose the schemas of their business applications with data-driven configuration. Service owners edit their schemas, and the changes are implemented in the corresponding services in real-time or near real-time. The DSS acts as a centralized service for storing the source-of-truth for constraints, fields, and any business logic that define their schema.

In some embodiments, the DSS employs a hierarchical graph structure (e.g., a directed acyclic graph) to determine the requested schema. Generally, each entity may correspond to a node or vertex in a particular graph structure. The graph structure can be provided by the service owner and can be defined based on their business application, for example, to reflect a multi-level business structure or a hierarchical categorization of products for sale. By traversing the hierarchical graph structure from a particular node through all of its parent nodes, a schema associated with that particular node is built from an aggregation of the fields associated with each node along the traversal path. In other words, the DSS constructs a requested schema by collecting data elements from a hierarchy. Unlike existing schema management systems, this allows schema at any level of the hierarchy to inherit properties and constraints from other higher-level authorities. Alternatively or additionally, a client service may only require a single schema with multiple fields. The DSS supports such client services even though a hierarchical graph structure would not apply.

The DSS-generated schema define the data and types of data that exist in the client service or system. The schema also define rules or constraints that apply to the data and/or the client service. For example, in some embodiments, the schema can define aspects of a user interface (UI) or user experience (UX), such as display properties (e.g., the location or order of fields on a display page generated by the client service) or a required field for data entry. Alternatively or additionally, the meta-schema can also define aspects of the UI and/or UX, for example, by requiring all subsequently created custom fields be displayed subordinate to an original data field.

FIG. 1 shows an exemplary network setup 100 for operation of a dynamic schema service with a plurality of client services. The illustrated setup 100 includes one or more computing devices 102 providing the dynamic schema service (DSS), multiple computing devices 106-106n providing respective client services, multiple client service owners 108-108n, multiple client service users 110-110x, and a network 104 that interconnects the computing device(s) 102, computing devices 106-106n, service owners 108-108n, and service users 110-110x. Network 104 includes any combination of networking hardware and software used to establish communications the various computing systems. For example, the network 104 can be an Internet area network (IAN), a wide area network (WAN), a local area network (LAN) connected to a WAN, or any other network configuration or combinations thereof. In some embodiments, client service user 110 may be part of an enterprise network separate from that of the DSS computing device 102 and/or the client service computing device 106. In such embodiments, network 104 can include hardware (e.g., modems, routers, switches, etc.) and software (e.g., firewall software, security software, billing software, etc.) to establish a networking link between the client service user 110 and the Internet and between the Internet and the DSS computing device 102 and/or the client service computing device 106. It should be appreciated that the network setup illustrated in FIG. 1 has been simplified and that many more networks and networking devices can be utilized to interconnect the various computing systems disclosed herein.

In the illustrated example, each client service computing device 106 has a network interface 112 (or endpoint), a service 114, and one or more data storage devices (e.g., database 116). As used herein, a service is a software function provide at a network address over the web or the cloud. Clients initiate service requests to servers and servers process the requests and return appropriate responses. The client service requests are typically initiated using, for example, an API request. For purposes of simplicity, service requests will be generally described below as API requests, but it is understood that other service requests can be made. An API request is a programmatic interface to a defined request-response message system, typically expressed in JSON or XML, which is exposed via the web—most commonly by means of an HTTP-based web server. Thus, in certain implementations, an API is defined as a set of Hypertext Transfer Protocol (HTTP) request messages, along with a definition of the structure of response messages, which can be in an Extensible Markup Language (XML) or JavaScript Object Notation (JSON) format. The API specifies a set of functions or routines that perform an action, which includes accomplishing a specific task or allowing interaction with a software component. When a service receives the API request from a client device, the service generates a response to the request and send the response to the endpoint identified in the request.

Each client service computing device 106 is associated with a respective client service owner 108, who can interact with the respective client service computing device 106 via network 104 and network interface 112. One or more client service users 110 can also interact with the client service computing device 106 via network 104. For example, each client service owner 108 and each client service user 110 can comprise a processor-based computing device, such as but not limited to a desktop computer, a laptop computer, a mobile device (e.g., personal digital assistant, tablet computer, cellular or smart phone, etc.), set-top box, or similar devices.

The client service owner 108 interacts with the client service computing device 106 to setup and maintain the offered service, while the client service user 110 interacts with the client service computing device 106 to avail itself of the offered service. Computing device 106 includes software and/or hardware that implements service 114. For example, in some embodiments, the client service computing device 106 provides a project or team management service, the client service owner 108 is an operator of the project management service, and the client service user 110 is a team member or project manager. The computing device 106 can receive an API request from service user 110 at network interface 112 to add, delete, or update a project goal. Service 114 can process the user request and update the relevant data stored in data storage device 116. In another example, in some embodiments, the client service computing device 106 provides an e-commerce website (e.g., Amazon.com) or other computer-network-based retail site, the client service owner 108 is an operator of the project management service (e.g., an Amazon catalog team), and the client service user 110 is a lister of goods on the e-commerce marketplace (e.g., an external vendor). The computing device 106 can receive an API request from service user 110 at network interface 112 to add, delete, or update a product listing. Service 114 can process the user request and update the relevant data stored in data storage device 116.

In the illustrated example, the DSS computing device 102 has a network interface 118, a service module 120, a first database 128, and a second database 134. The network interface 118 acts as an endpoint through which DSS computing device 102 can interact with one or more clients over network 104. For example, the endpoint can constitute an application programming interface (API) or an API gateway service that generates one or more APIs, with each API conforming to the representational state transfer (REST) standard. In a particular exemplary embodiment, the endpoint is provided by Amazon API Gateway service. Alternatively, network interface 118 provides a website-based interface through which clients interact with DSS computing device 102. Alternatively or additionally, network interface 118 provide a command-line interface (CLI) through which clients interact with DSS computing device 102.

As used herein, "client" refers to any direct consumer of the service offered by DSS computing device 102. Accordingly, client can include any of the client service computing devices 106n and client service owners 108n. For example, the client service owners 108n interact with the DSS computing device 102 to initially define and/or subsequently modify the schema, meta-schema, and any additional constraints or meta-data that applies to their respective client service. In another example, the client service computing devices 106n interact with the DSS computing device 102 to retrieve corresponding schema, modify existing schema, and/or validate data based on the schema. Clients may also have consumers of their own that are capable of interacting with the schema, although such consumers may not be a direct consumer of the service offered by the DSS computing device 102. For example, client service users 110 can input data to the client service computing device 106 based on the schema from the DSS, or client service users 110 can modify schema in the DSS computing device 102 via the corresponding client service computing device 106. Each client can have a unique identifier in the dynamic schema service computing device 102, so that requests from the client can be authorized and/or allow correlation with the corresponding schema and meta-schema. In some embodiments, DSS computing device 102 employs an authentication and authorization service, such as Amazon Web Services Identity and Access Management (AWS IAM) service, to allow a client to make requests of the service module 120.

In the illustrated embodiment, service module 120 of the DSS computing device 102 includes at three sub-modules, in particular, a schema editing module 122, a schema building module 124, and a validation module 126. However, in other embodiments, fewer or additional sub-modules can be provided, or sub-modules can be combined together, for example, as a single module of service module 120 without explicit delineation between functions. The schema editing module 122 modifies associated schema maintained by the DSS computing device 102, for example, in response to a modification request received at network interface 118 from a client (e.g., client service owner 108, client service computing device 106, or client service user 110). The schema building module 124 retrieves associated schema maintained by the DSS computing device 102, for example, in response to a schema request receive at network interface from a client. In some embodiments, the schema building sub-module 124 includes a compiler that compiles the schema (e.g., the corresponding JSON Schema) for use by a particular client service computing device 106 (e.g., as a JSON object).

In the illustrated embodiment, schema 136 for each of the client services 106-106n are stored in database 134. Since the DSS computing device 102 can simultaneously support multiple independent client services 106-106n with their own respective schema 136 (or multiple schema), the DSS computing device 102 is considered a multi-tenant service. The DSS computing device 102 stores the schema as a directed acyclic graph (e.g., a hierarchical graph structure), with each graph 138-138n corresponding to a respective one of the client services 106-106n. The graph 138 has a set of vertices, each of which is connected one or more vertices in a different hierarchical level of the graph by an edge to represent the relationship of data in the client service 106. Depending on the client application, the graph 138 may have numerous hierarchy vertices (e.g., on the order of hundreds or thousands) or may have a single vertex. Each vertex in the hierarchical structure can have multiple related field vertices.

Using the graph 138, a schema for a particular entity or item is derived by the DSS computing device 102. In particular, the DSS computing device 102 aggregates schema fields associated with vertices connected between different levels in the hierarchy, as described in further detail below. As used herein, "schema" refers to the data fields (e.g., data model) and any related constraints for a particular entity (e.g., client resource, project management goal, item for sale, etc.), and "schema field" refers to a single field in the schema associated with a single hierarchy vertex. The schema field can include meta-data, such as, identifier (id), name, constraints, display properties, and any client-defined properties. The language for the schema is selected to support simple constraints as well as complex constraints (e.g., conditions (if this, then that) or arithmetic operations). In the project management context, an example of a conditional constraint is "If the Status is Yellow or Red, then a Path To Green is required," and an example of an arithmetic operation constraint is "Completion Date must be greater than or equal to Revised Due Date." In an exemplary embodiment, the schema language is JSON Schema or JSON Hyper-Schema. JSON Schema has multiple specifications (or versions) that offer different features, and clients can choose with which version their schemas are validated.

In the illustrated embodiment, database 134 is a graph database, such as Amazon Neptune. Each field in the graph keeps an immutable version history of all changes over time. Alternatively or additionally, prior to significant changes to a stored schema by the schema editing module 122 or as otherwise requested by a client, the schema is stored as a prior version, and the changed schema is stored as a current version. In some embodiments, a search service interacts with the graph database 134, for example, to index field data and allow full search capabilities across all fields in each graph. In an exemplary embodiment, the search service is Amazon Elasticsearch Service, and the index is populated from logs of changes to the graphs (e.g., Amazon Neptune Streams).

Alternatively, in some embodiments, the schema 136 can be stored in another type of database, such as a structured query language (SQL) database, a non-relational distributed database (e.g., a NoSQL database, such as Amazon DynamoDB), or any other type of network-based data storage system. In such alternative configurations, the hierarchical relationship between nodes (e.g., vertices or entity types) can be maintained in the stored schema, for example, by storing a separate field for each node that specifies an immediate parent node thereof. A first table in the database captures data for each node, including schema, schema fields, and any meta-schemas. Updates to data in the first table, for example, by the schema editing module 122, modifies the current record, and the DSS computing device 102 stores an immutable copy of the prior version in a separate second table (e.g., a DSSAuditHistory table).

In the illustrated embodiment, the validation module 126 ensures compliance of modified schema, or fields thereof, with previously defined system constraints. As used herein, "constraints" refers to the rules or restrictions defined by a client for fields in the schema. Some constraints are critical business logic while other constraints keep data consistent. For example, simple constraints can include allowed field type, allowed field values, allowed data format, and limits on data values, while complex constraints can include defining certain fields as required and conditional restrictions based on other fields. As noted above, the schema itself may contain meta-data that defines constraints. In addition, the DSS computing device 102 employs meta-schema to define limits for field definitions in the schema and the type of changes that are allowed. In some embodiments, the meta-schema may also define UI/UX properties that are required for fields. Each graph 138 has a corresponding meta-schema associated therewith, although, in some embodiments, different graphs can use the same meta-schema (e.g., a default meta-schema offered by the DSS computing device 102).

The meta-schema is defined or adopted by the client for a particular graph 138 and service offered by client service computing device 106. The meta-schema helps client manage the complexity of fields in their schema. In the illustrated embodiment, meta-schema 130 for each of the client services 106-106n are stored in database 128, which may be an SQL database, a NoSQL database, or any other type of network-based data storage system. In some embodiments, when schema 136 is stored in a table rather than as a graph, databases 128 and 134 can be combined together and schema 136 and meta-schema can be stored in the same table.

Clients can modify the meta-schema, for example, to change existing limitations or impose new limitations on the creation of fields or other modification of schema by users of 110 of client service computing device 106. For example, schema editing module 122 or another sub-module of service module 120 can modify the stored meta-schema 130 associated with a graph 138 in response to a client request received at network interface 118. In some embodiments, clients can version their meta-schema in order to add new features for their service (e.g., adding capabilities for multi-select fields instead of just string and number fields) without introducing conflicts to the existing code in the client service computing device 106 and/or disrupting the experience of a user 110 of the service. Clients pass in the meta-schema version when creating or editing fields in their graph, aggregating their schema, or validating input data. In some embodiments, a client can create and store in DSS computing device 102 one or more new versions of the meta-schema in anticipation of changes to the client service offered by computing device 106, for example, to conduct A/B testing.

The meta-schema is used to validate changes to the schema requested by a client. The validation can be performed by a validation module 126, which applies the meta-schema to each field definition. The validation module 126 can also apply the constraints for each field in the client schema to ensure data input to the client service computing device 106 is valid. For example, the validation module 126 calls a library function 132 to execute validation using the meta-schema 130. The validation results provide details about whether the data input adheres to the constraints defined in the schema. In some embodiments, the validation module 126 can cooperate with the client service computing device 106 to perform the validation of input data. Alternatively or additionally, the client service computing device 106 independently performs the validation of input data based on the constraints defined in the schema, for example, by calling the same library function 132, or a different library function, to execute validation using the schema provided by schema building module 124. Since each schema is compiled as a JSON object, data input to the client service computing device 106 (e.g., by a user 110) can be validated isomorphically, with the client service computing device 106 (e.g., the front-end) employing the same schema structure to execute validation on input data as the DSS computing device 102 (e.g., the back-end). This may help improve consistency between the user experience and API behavior.

In some embodiments, validation module 126 can validate data input to client service computing device 106 by client service user 110. The validation module uses library function 132 to validate the input data (e.g., at the time of writing or putting) based on the specified schema, in particular, the constraints defined in the schema, or to return an error signal to the user 110 via client service computing device 106 if the input data violates any of the defined constraints. The validation module 126 can use an existing validator library function 132. For example, JSON Schema has validator libraries available in multiple computing languages, and a validator such as Another JSON Schema Validator (AJV) can be used. Since AJV is a JavaScript library, validation can be performed in Node.js environments as well as in browsers (e.g., isomorphic). Moreover, the availability of JSON Schema validator libraries can allow client services to execute their own validation using the compiled schema from the DSS computing device 102, without otherwise sending the data to the DSS computing device 102.

As noted above, clients can interact with the DSS computing device 102 by sending API requests to network interface 118. For example, when a client service computing device 106 receives a request from a client service user 110 to display data associated with an item, the client service computing device 106 sends an appropriately formatted API request to the DSS computing device 102 requesting the current schema associated with the item. The schema returned by the DSS computing device 102 is used by the client service computing device 106 to retrieve data corresponding to the fields of the schema from its database 116 as well as to display the data to the client service user 110. In another example, when a client service owner 108 desires to modify the schema or meta-schema associated with client service computing device 106, the client service owner 108 sends an appropriately formatted API request to the DSS computing device 102 detailing the requested change. Examples of API requests that can be used with the DSS computing device 102 to retrieve or modify schema, schema fields, or meta-schema are shown in Tables 1-3 respectively. Other types and formats for API requests to the DSS computing device 102 are also possible.

TABLE 1

Example of API Requests to DSS for Schema

| API Name | Method | Details |
| --- | --- | --- |
| Create Schema | POST | Used to create a new schema for a requesting client. Client request can include schema language version (e.g., JSON Schema version) and corresponding meta-schema id. Fields can be added to schema after creation. Example path: /api/v1/schemas |
| Update Schema | PUT | Used to create a new node in an existing schema version by a requesting client. The request can include a unique node id for the created node. Example path: /api/v1/schemas/{schemaId}/versions/{schemaVersion}/vertex |
| Get All Schema | GET | Used to retrieve a list of all schemas for a requesting client. List can return all versions for every schema. DSS may use a "client-type" global secondary index (GSI) to compile the list of schemas Example path: /api/v1/schemas?clientId={clientId}&pageSize=[0-64]&cursor={DDBLastEvaluatedKey} |
| Get All Schema Versions | GET | Used to retrieve a list of all version of a particular schema for a requesting client. DSS may use a "beginsWith" query on the sort key for the database table using the schema ID and sorting by version number. Example path: /api/v1/schemas/{schemaId}pageSize=[0-128]&cursor={DDBLastEvaluatedKey}&sort={"asc"|"desc"} |
| Get Schema Version | GET | Used to retrieve a single version of a particular schema for a requesting client, for example, for use in validating data input. Example path: /api/v1/schemas/{schemaId}/versions/{schemaVersion} |
| Get Schema Version Audit History | GET | Used to retrieve an audit history for a particular schema version for a requesting client. DSS may store changes made to each schema version in a separate Audit History table, and can use an appropriate sort key to extract the information from the Audit History table. Example path: /api/v1/schemas/{schemaId}/versions/{schemaVersion}/history?pageSize=[1-64]&cursor={DDBLastEvaluatedKey}&sort={"asc"|"desc"} |

TABLE 1-continued

Example of API Requests to DSS for Schema

| API Name | Method | Details |
| --- | --- | --- |
| Update Schema Version | PUT | Used to update the schema version description by a requesting client. However, the schema language version and the meta-schema id can be changed via the Increment Schema Version API, to avoid conflicting changes.<br>Example path: /api/v1/schemas/{schemaId}/versions/{schemaVersion} |
| Increment Schema Version | PUT | Used to update the schema version description, the schema language version, and the meta-schema id by a requesting client. DSS creates a schema version with a version number incremented over the indicated version in the request (although if the new version number already exists, the request fails). The request may also allow for migrating of one or more fields from the current schema version to the schema version.<br>Example path:<br>/api/v1/schemas/{schemaId}/versions/{schemaVersion}/increment?isFieldDataMigrated={true\|false}&excludedField={fieldId}&excludedField={fieldId}... |

TABLE 2

Example of API Requests to DSS for Schema Fields

| API Name | Method | Details |
| --- | --- | --- |
| Create Schema Field | POST | Used to create a new field in the provided schema version by a requesting client. The request can include a unique field id for the created field.<br>Example path:<br>/api/v1/schemas/{schemaId}/versions/{schemaVersion}/fields |
| Get Schema Field | GET | Used to retrieve a single schema field definition by a requesting client.<br>Example path:<br>/api/v1/schemas/{schemaId}/versions/{schemaVersion}/fields/{fieldId} |
| Get Schema Field Audit History | GET | Used to retrieve an audit history for a particular schema field for a requesting client. DSS may store changes made to each schema field in a separate Audit History table, and can use an appropriate sort key to extract the information from the Audit History table.<br>Example path:<br>/api/v1/schemas/{schemaId}/versions/{schemaVersion}/fields/{fieldId}/history?pageSize=[1-64]&cursor={DDBLastEvaluatedKey}&sort={"asc"\|"desc"} |
| Get All Schema Version Fields | GET | Used to retrieve all of the fields associated with a particular schema Example path: version by a requesting client.<br>/api/v1/schemas/{schemaId}/versions/{schemaVersion}/fields |
| Update Schema Field | PUT | Used to update an existing field's conditional constraints and/or definition (e.g., JSON Schema) by a requesting client. DSS validates the changes with the schema's meta-schema and can create audit versions for both the field and schema. DSS can also update any compiled schema. To avoid hierarchical field aggregation in the schema version in order to update the compiled schema, the DSS can update the existing field in the JSON Schema "properties" field. For changes to conditional constraints, the DSS can iterate through existing schema constraints and find specific constraints to update (e.g., by matching an identifier or comparing object properties).<br>Example path:<br>/api/v1/schemas/{schemaId}/versions/{schemaVersion}/fields/{fieldId} |
| Delete Schema Field | DELETE | Used to delete an existing field by a requesting client. DSS can mark the existing field as deleted and remove it from the schema. The deleted field can be retrieved from the Audit History table after deletion, and it can otherwise remain referenced in schema audit versions. This API can also rely on the Increment Schema Version API if the client requests the deletion be associated with a change in schema version. All other fields besides the deleted field can be migrated by DSS to the new schema version.<br>Example path: /api/v1/schemas/{schemaId}/versions/{schemaVersion}/fields/{fieldId}?isSchemaVersionIncremented={true\|false} |

TABLE 3

Examples of API Requests to DSS for Meta-Schema

| API Name | Method | Details |
|---|---|---|
| Create Meta-Schema | POST | Used to create a new meta-schema. The created meta-schema can adhere to the schema language specification (e.g., JSON Schema specification/version).<br>Example path: /api/v1/metaSchemas |
| Get Meta-Schema | GET | Used to retrieve a particular meta-schema, for example, to allow clients to execute isomorphic schema field validation at the client service (e.g., on their own or in addition to validation by DSS).<br>Example path: /api/v1/metaSchemas/{metaSchemaId} |
| Get Meta-Schema Audit History | GET | Used to retrieve an audit history for a particular meta-schema for a requesting client. DSS may store changes made to each meta-schema in a separate Audit History table, and can use an appropriate sort key to extract the information from the Audit History table .<br>Example path: /api/v1/metaSchemas/{metaSchemaId}/history?pageSize=[1-64]&cursor={DDBLastEvaluatedKey}&sort={"asc"\|"desc"} |
| Get All Client Meta-Schemas | GET | Used to retrieve a list of all meta-schemas for a requesting client. DSS may use a "client-type" global secondary index (GSI) to compile the list of meta-schemas.<br>Example path: /api/v1/metaSchemas?clientId={clientId}&pageSize=[0-64]&cursor={DDBLastEvaluatedKey} |
| Update Meta-Schema | PUT | Used to change an existing meta-schema. Instead, if the changed meta-schema may cause issues for any associated schema, a new meta-schema can be created and the associated schema can be incremented to a new version with the new meta-schema.<br>Example path: /api/v1/metaSchemas/{metaSchemaId} |

Figure 2:
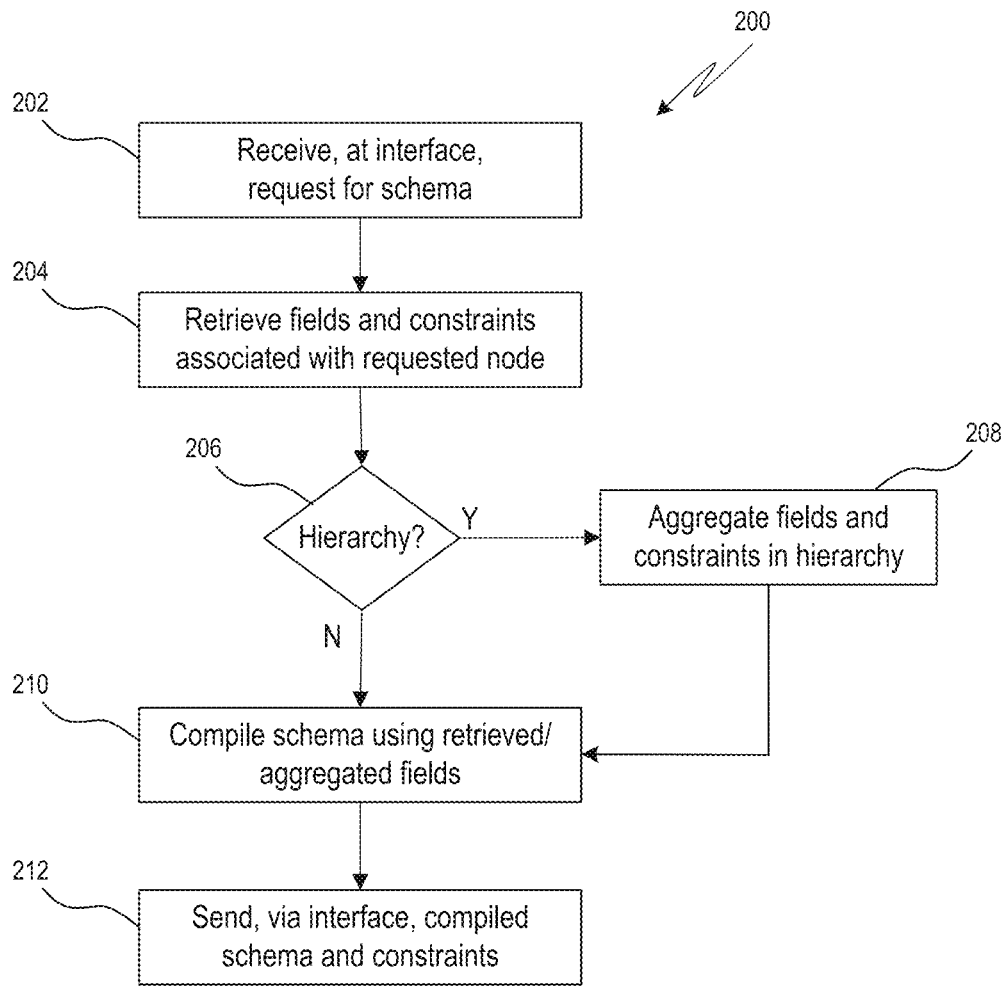
FIG. 2 is a process flow diagram for an exemplary method for vending of schema by a dynamic schema service.

FIG. 2 illustrates a process flow diagram for an exemplary method 200 for vending of schema by a DSS. The method 200 initiates at process block 202, where a request is received for schema by the DSS. For example, the request can be from a client service computing device 106, which requires the schema in order to generate a display or report, or for use in accepting data input from a user 110 of the client service, or for any other purpose. The request can be received at an interface of the DSS, such as network interface 118 of DSS computing device 102. As discussed in detail above, the request to the DSS can be an API request, although other request types are also possible.

In response to the received request, the method 200 proceeds to process block 204, where schema fields and constraints stored by the DSS for the client service are retrieved. For example, the request can be for schema associated with a particular item or entity, which corresponds to a node or vertex in a graph 138 stored in the DSS computing device 102. For example, the retrieval can be performed by schema building module 124 by accessing schema 136 stored in database 134.

At decision block 206, the method 200 determines whether the stored schema for the client service employs a hierarchical graph structure. For example, the schema 136 retrieved from database 134 may include an identifier indicating the use of a hierarchical graph structure, or the schema building module 124 can otherwise analyze the data contained in the retrieved schema 136 to determine if a hierarchy is present. If a hierarchical graph structure is employed, the method 200 proceeds to process block 208, where the requested schema is built by aggregating schema fields and constraints in the hierarchy. For example, the schema building module 124 traverses graph 138 from the node corresponding to the particular item or entity up through each connected parent node and accumulates the fields and constraints associated with each node along the traversal.

After process block 208 or if no hierarchical graph structure was otherwise employed (e.g., the graph has a single node with associated schema fields and constraints), the method 200 proceeds to process block 210, where the schema is compiled using the retrieved and/or aggregated schema fields and constraints. For example, the schema building sub-module 124 compiles the JSON Schema of the retrieved or aggregated schema fields and constraints as a JSON Object for use by the requesting client service computing device 106. At process block 212, the compiled schema (with constraints) is sent to the requestor, for example, via network interface 118.

In some embodiments, every graph stored by the system is considered a hierarchical graph structure, with any graph having a single node being a hierarchical graph with a hierarchy (e.g., number of levels) of n=1. However, those graphs with n=1 can be modified at any time to include additional nodes and levels. In such embodiments, a distinction in method 200 need not be made between single level graphs and hierarchical graphs, and decision block 206 in FIG. 2 can simply be replaced with process block 208.

In some embodiments, instead of building the schema from scratch each time a request is received, previously-built and compiled schema corresponding to one or more client services can be cached for low-latency performance. For example, schemas can be cached for each vertex in the hierarchy, and a request for schema associated with one of the vertices can be completed without having to rebuild the schema from aggregated schema fields. In the event of a change made to a field associated with the vertex or any parent vertices in the hierarchy, the cache of the schema for that vertex can be invalidated, thereby requiring building of the schema again as discussed in FIG. 2.

Figure 3A:
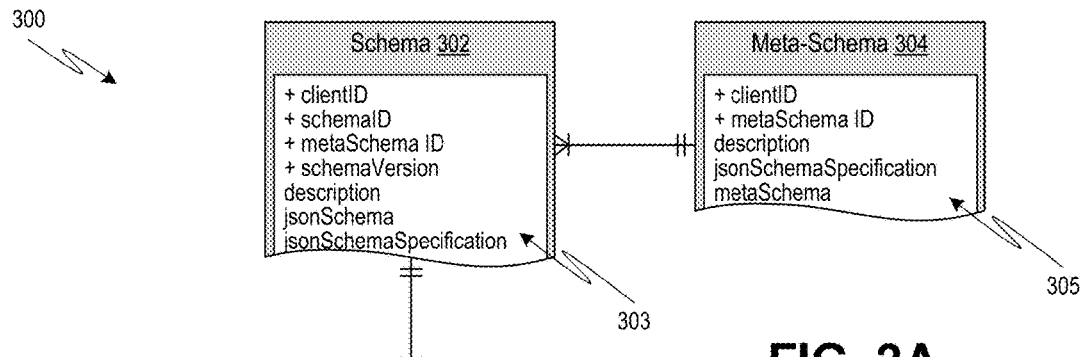
FIG. 3A shows an exemplary data for the schema, schema fields, and meta-schema with a dynamic schema service.

FIG. 3A shows an exemplary data structure 300 for schema 302, schema fields 306, and meta-schema 304 in a DSS. Each of the entities 302, 304, 306 has respective meta-data 303, 305, 307 that define properties thereof. In addition to the meta-data illustrated, each entity can also have meta-data stored for client (e.g., for authorization), created by, created time, modified by, and modified time properties. Moreover, in addition to the meta-data 307 illustrated in FIG. 3A for schema field 306, additional meta-data can be added to every field, such as label (with i18n support), input type, description, help text, etc. This can allow clients to create custom fields with complex constraints, and allow the DSS to authoritatively manage those fields for use by the client service, for example, in generating user interfaces, accepting data input, reporting, providing search or discovery, etc.

In general, multiple fields compose a single schema 302, although only a single schema field 306 is shown in FIG. 3A. Each schema field 306 is attached to only a single schema 302. While this may require duplication of data across schemas and increase complexity at the client-side, it can simplify processing at the DSS side. Each field is defined individually to allow easier modification, as compared to requiring clients to change all constraints in their schema at once.

The schema version (e.g., schemaVersion) is attached to each schema field 306 as well as each schema 302. Thus, the same schema fields that otherwise use different schema versions are considered to be unique in the DSS system. Clients can thus version the schema and make changes to individual schema fields between schema versions, for example, according to new meta-schema constraints, conditional constraints, etc. This setup also allows schema fields to be deleted between schema versions.

The meta-schema 304 is configuration written in JSON Schema that defines the structure and limits of schema 302 and schema fields 306. For example, the meta-schema 304 can define characteristics of fields (e.g., "all string fields have a max character limit of 4096"), format for fields (e.g., "date-time fields must use ISO 8601 time format"), available field types (e.g., "limited to string, number, and string array"), conditional constraint limits (e.g., limiting the number a field can define or disallowing conditional constraints in the schema altogether), field identifier limits (e.g., limiting the field identifiers allowed in a schema, effectively rejecting new fields), etc. In some embodiments, a single meta-schema 304 can be attached to multiple schemas 302, for example, by reference to a common metaSchemaID in meta-data 303 of each schema. The sharing of meta-schema 304 can be useful for situations where clients manage multiple hierarchical schemas or where multiple schemas can be applied to the same entities in their system. The meta-schema 304 can dictate the types of changes allowed for any of those schemas.

Figure 3B:
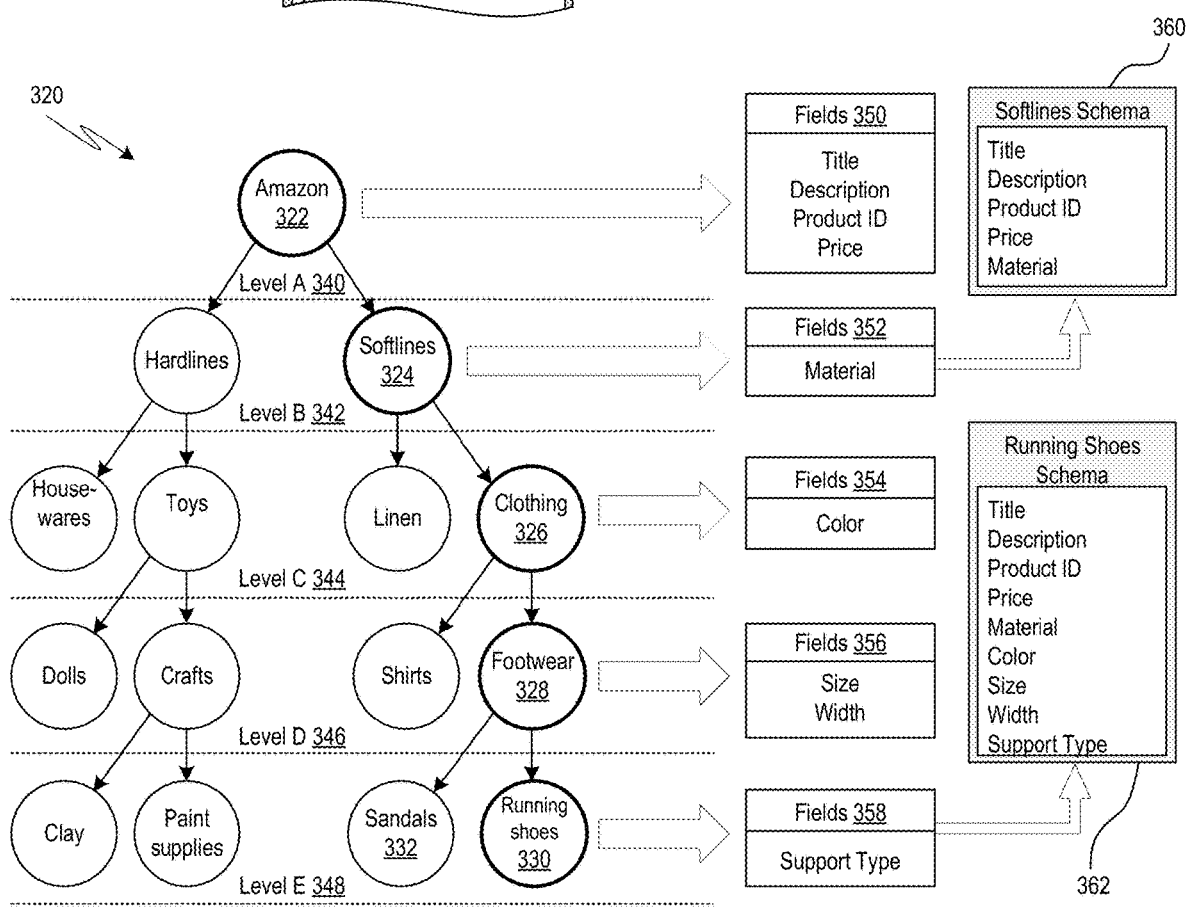
FIG. 3B shows an exemplary hierarchical graph structure and exemplary schema built by a dynamic schema service using the graph.

FIG. 3B shows an exemplary hierarchical graph structure 320 that can be employed in a DSS system to generate schema for an e-commerce marketplace service. The owner/operator of the marketplace service can initially create the graph 320 based on the hierarchical nature of the product catalog and common fields between products. In the illustrated example, at a top level 340, a single vertex or node 322 is defined with schema fields 350 that are common to all products sold by the marketplace service, for example, title, description, product ID, and price. At level 342, products sold by the marketplace service are categorized into one of two nodes based on high-level departments, e.g., hardlines or softlines. Each subsequent child level 344-348 categorizes products into nodes defining groupings with further granularity, only a small sampling of which is illustrated in FIG. 3B.

To determine a schema for a requested entity, the DSS traverses the graph 320 from the most granular node corresponding to the requested entity to the node 322 at the top level 340 via connections (e.g., edges) between the nodes of the different levels. Along the traversal, the DSS aggregates the schema fields and constraints defined for each node to build the requested schema. For example, if the e-commerce marketplace service requests schema for softlines, the DSS traverses graph 320 from node 324 in level 342 to parent node 322 in level 340. Schema fields 352 associated with node 324 and schema fields 350 associated with node 322 are combined to yield the fields for the requested softlines schema 360. In another example, if the e-commerce marketplace service requests schema for running shoes, the DSS traverses graph 320 from node 330 in level 348 to parent node 322 in level 340 via intervening nodes 328 (corresponding to the general category of footwear), 326 (corresponding to the more general category of clothing), and 324 (corresponding to the even more general category of softlines). Schema fields 350-358 associated with each node 322-330 along the traversal path are combined to yield the fields for the requested running shoe schema 362.

By using the hierarchical graph structure to build schema, the number of changes required to update or modify schema can be reduced. For example, if the e-commerce marketplace service requests a change to a field or schema that pertains to all footwear, that change can be made once to the schema fields 356 associated with node 328 in level 346, rather than making multiple changes for each child node 330, 332 in level 348. In other words, changes made to nodes at higher levels are automatically inherited by connected nodes at lower levels. Moreover, the hierarchical graph structure allows the generating of schema specific to a client request rather than returning all schema for the client service. For example, in rendering a detail page for a running shoe, the e-commerce marketplace service does not need schema details for paints supplies or other child nodes extending from the hardlines department. Instead, the DSS can simply provide the schema most relevant to the request, e.g., the running shoe schema 362 corresponding to node 330.

As noted above, the graph 320 is stored in a graph database (e.g., Amazon Neptune). The graph database can be used to execute schema aggregation queries. The hierarchical data model supported by the graph database can allow clients to store as little as one node or vertex and up to thousands of hierarchical nodes, each with a set of fields related to them by edges in the graph. In the illustrated example of FIG. 3B, the set of schema fields is graphically associated with a corresponding node using a single block arrow. However, in some embodiments, the graphical representation in the graph database may employ two types of vertices—hierarchy vertices (e.g., nodes 322-332) and field vertices (e.g., separate nodes for each schema field in sets 350-358).

Figure 4:
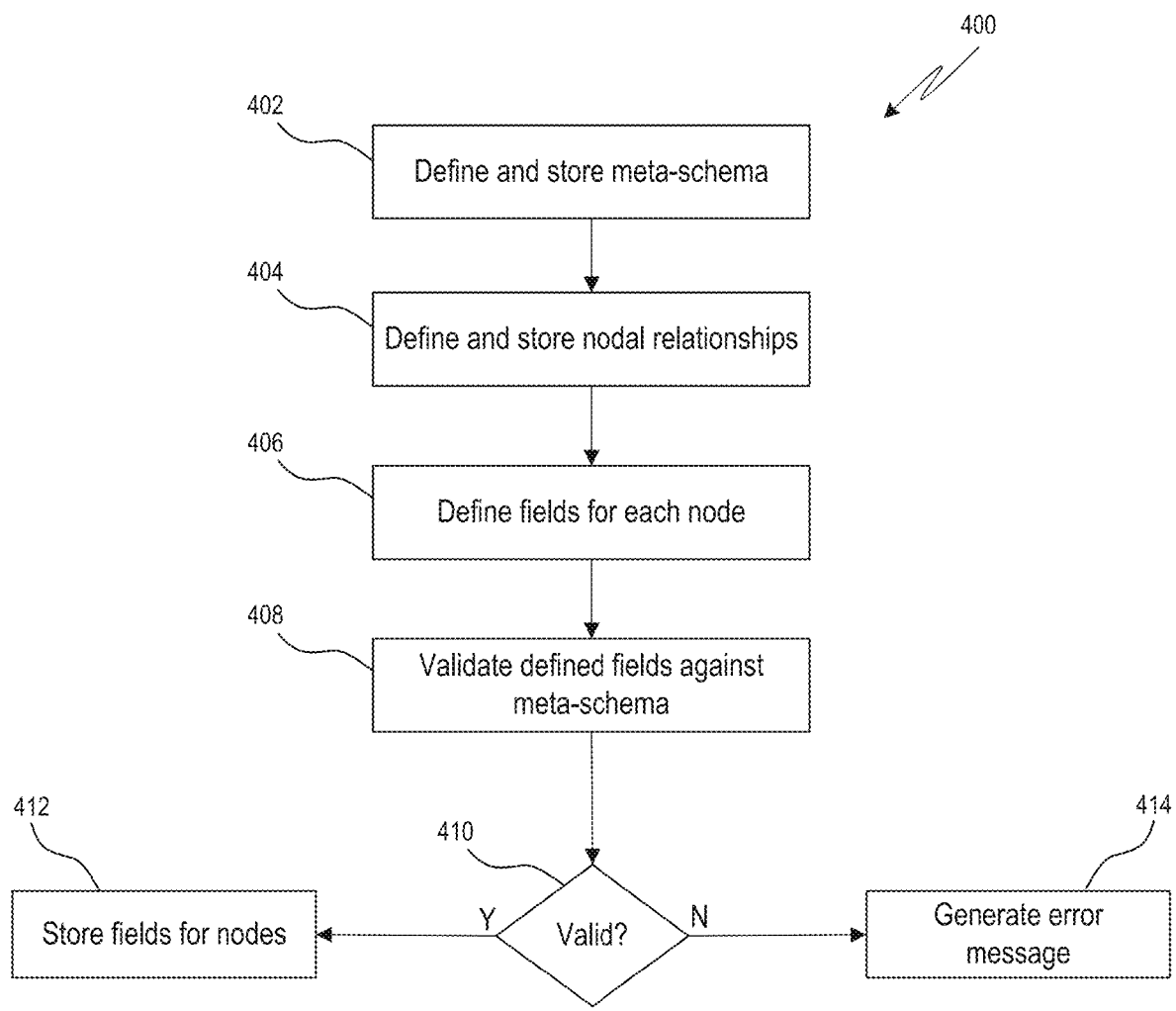
FIG. 4 is a process flow diagram for an exemplary method for initial creation of schema and associate fields in a dynamic schema service.

FIG. 4 illustrates a process flow diagram for an exemplary method 400 for initial creation of schema and schema fields using the DSS. The method 400 initiates at process block 402, where a client defines desired meta-schema and the defined meta-schema is stored in the DSS, for example, as meta-schema 130 in database 128. As noted above, the meta-schema defines the structure and limits of schema and schema fields in the system. Alternatively or additionally, the meta-schema or portions thereof can be provided by the DSS, for example, as a default option for clients or by reference to a previously-defined meta-schema already stored in the DSS.

The method 400 proceeds to process block 404, where a client defines the hierarchical graph structure for building the schema. The graph structure may follow a hierarchy of the data structure of the client service, for example, according to a hierarchy of a product catalog (e.g., as shown in FIG. 3B) or a corporate structure. The client defines nodes or vertices in the hierarchy as well as the connections or edges therebetween. Alternatively, in some embodiments, a client may define the graph without any hierarchy, for example, as a single node with multiple schema fields, where all requested schema include all of the fields associated with the single node.

The method 400 proceeds to process block 406, where a client further defines one or more schema fields associated with each node. The resulting hierarchical graph structure is validated by the DSS at process block 408 to ensure the defined schema fields do not violate any limitations of the previously-defined meta-schema. For example, validation module 126 can retrieve meta-schema 130 from database 128 and perform the validation check. If one of the schema fields is determined to be invalid at decision block 410, the method 400 proceeds to process block 414, where the DSS generates an error message for the client. Otherwise, the method 400 proceeds to process block 412, where the hierarchical graph structure is stored by the DSS, for example, as one of graphs 138 in database 134, for later use in building schema requested by the client service.

Figure 5:
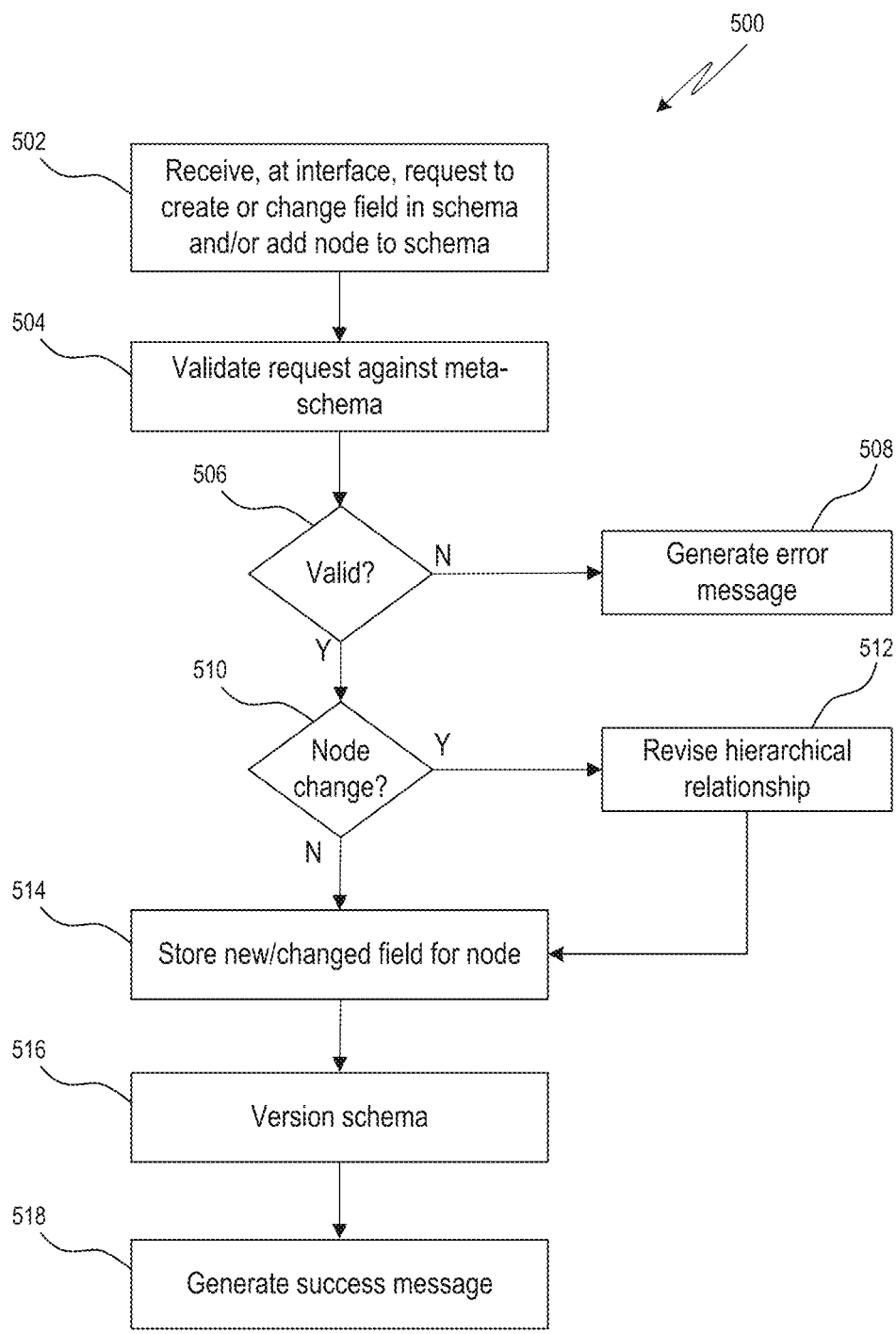
FIG. 5 is a process flow diagram for an exemplary method for changing or adding a field in an existing schema in a dynamic schema service.
Figure 6:
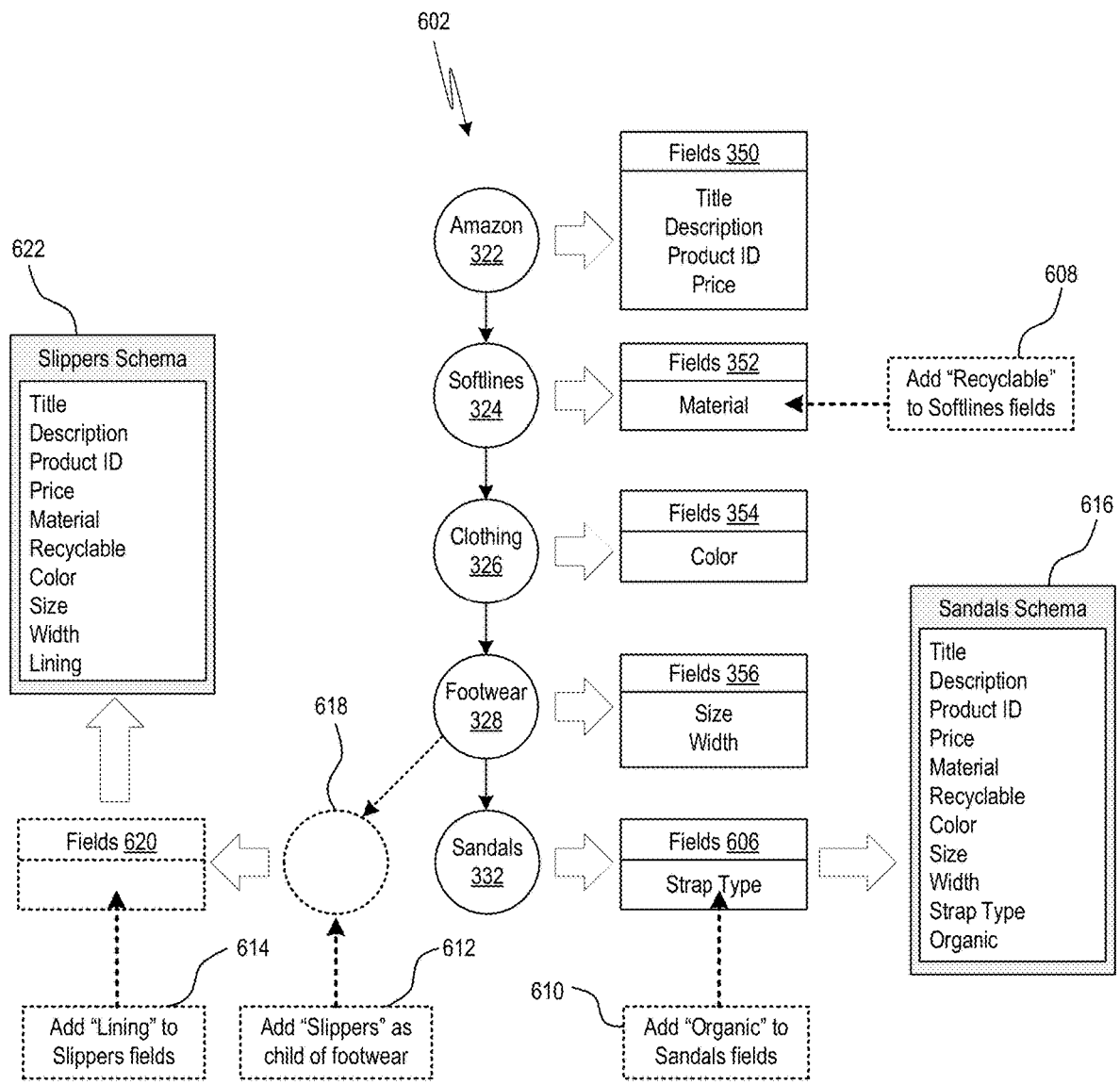
FIG. 6 shows an exemplary hierarchical graph structure being modified and exemplary schema built by a dynamic schema service using the modified graph.

FIG. 5 illustrates a process flow diagram for an exemplary method 500 for modifying an existing schema using the DSS, for example, to add a new node in the hierarchy, or changing or adding a schema field associated with a node. FIG. 6 shows modification of an exemplary hierarchical graph structure 602 (e.g., a simplified version of FIG. 3B), according to the method of FIG. 5. The method 500 initiates at process block 502, where a request is received by the DSS for creating or changing (e.g., updating or deleting) a schema field and/or adding a new node in the hierarchy. For example, the request can be from a client service computing device 106 or from a client service owner 108, which have authenticated and authorized (e.g., by AWS IAM) by the DSS prior to or as part of receiving the request. The request can be received at an interface of the DSS, such as network interface 118 of DSS computing device 102. As discussed in detail above, the request to the DSS can be an API request, although other request types are also possible.

At process block 504, the requested modification is validated by the DSS to ensure the new or changed schema field does not violate any limitations of the previously-defined meta-schema. For example, validation module 126 can retrieve meta-schema 130 from database 128 and perform the validation check. If the modification, or any part thereof, is determined to be invalid at decision block 506, the method 500 proceeds to process block 508, where the DSS generates an error message for the requestor. Otherwise, the method 500 proceeds to decision block 510, where it is determined if the requested modification changes a node relationship in the previously stored hierarchical graph structure (e.g., by adding a new vertex, deleting a vertex, or changing edges between vertices).

If the modification involves a change to the hierarchical vertices, the method 500 proceeds to 512, where the hierarchical graph structure is reordered according to the modification. For example, schema editing module 122 can perform the update to the hierarchical graph structure. Alternatively, in some embodiments, changes (e.g., addition of nodes, deletion of nodes, or altering edge connections between nodes) in the hierarchical graph structure are performed by the client using a separate interface and subsequently uploaded to the DSS for validation and storage (e.g., according to the process of FIG. 4). In such embodiments, decision block 510 and process block 512 can be omitted from method 500, and process block 514 can instead proceed directly from decision block 506. Otherwise, after process block 512 or if no change to the hierarchical vertices is required, the method 500 proceeds to process block 514, where the modification involving only the schema field is applied to the hierarchical graph structure and stored. For example, schema editing module 122 can perform the requested schema field modification on the hierarchical graph structure and can store the modified graph structure in database 134.

For example, in FIG. 6, the modification includes a request 608 to add a first new schema field (recyclable) associated with vertex 324 (softlines) and a request 610 to add a second new schema field (organic) associated with vertex 332 (sandals). The modification also includes a request 612 to add a new child node 618 (slippers) from parent node 328 (footwear) and a request 614 to add a field (lining) as the schema field 620 associated with the new node 618. If the requested modifications pass validation based on the meta-schema associated with graph 602, the schema editing module 122 proceeds to modify graph 602 to include the requested changes. The added schema field to the softlines vertex 324 is propagated to its connected children vertices when schema is built in response to a client service request. For example, the resulting schema 616 associated with sandals vertex 332 includes all of the fields 350-356 and 606, including the new fields added by requests 608, 610. Similarly, the resulting schema 622 associated with new slippers vertex 618 includes all of the fields 350-356 and 620, including the new fields added by requests 608, 614.

Returning to FIG. 5, the method 500 proceeds to process block 516, where the unmodified hierarchical graph structure can optionally be stored as a prior version. For example, the modification request by the client may include a request for the schema to be versioned, or the DSS may automatically apply versioning to the hierarchical graph structure for each modification or in response to substantial changes. The method 500 concludes at process block 518, where a message is generated by the DSS to indicate to the requestor that the modification was successful.

Figure 7:
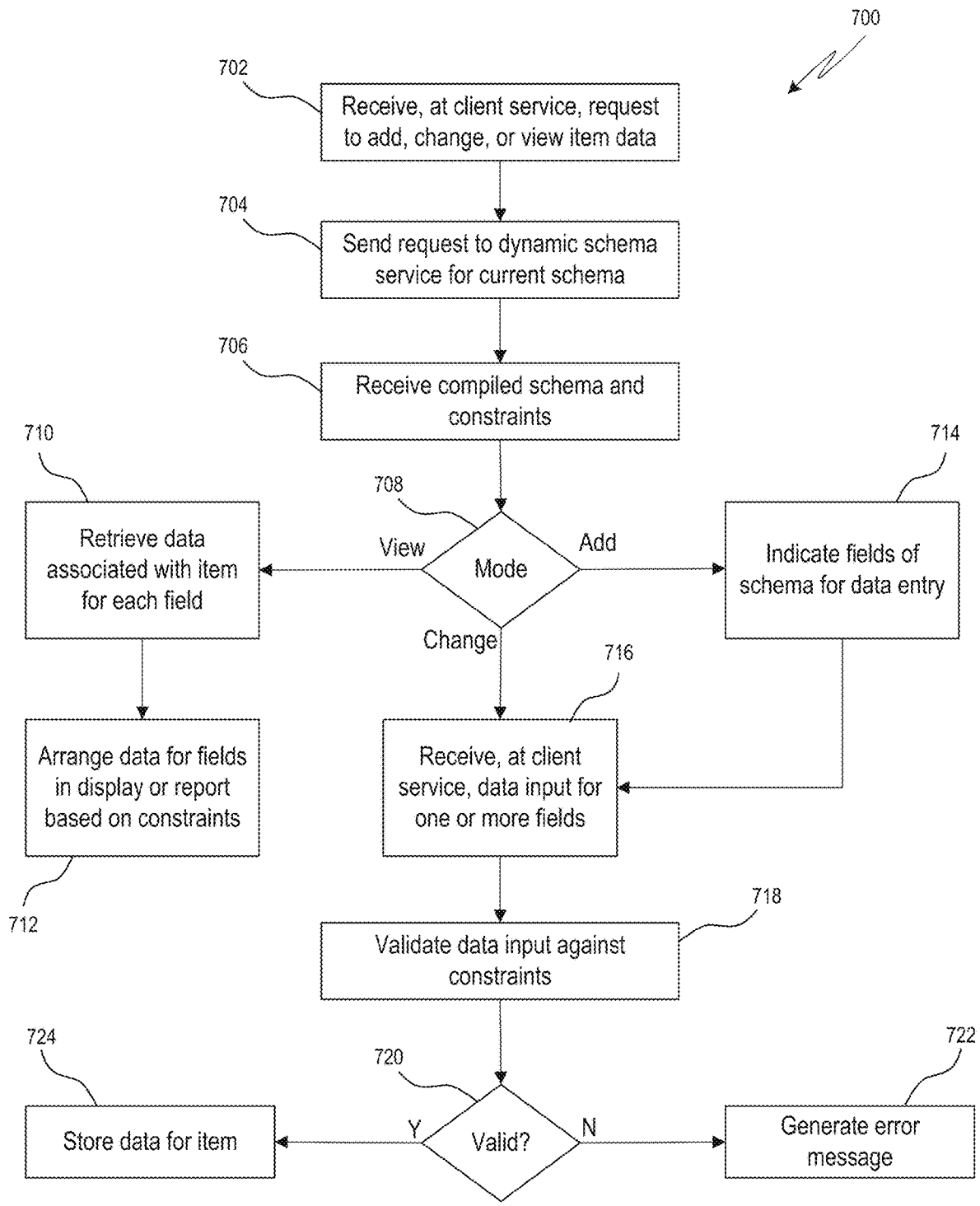
FIG. 7 is a process flow diagram for an exemplary method for viewing, adding, or changing data using schema from a dynamic schema service.

FIG. 7 illustrates a process flow diagram for an exemplary method 700 for viewing, adding, or changing data using schema vended by the DSS. The method initiates at process block 702, where a request is received at a client service to add, change (e.g., update or delete), or view item or entity data. For example, the request can be from a client service user 110. The request can be received at an interface of the client service, such as network interface 112 of client service computing device 106. The request to the client service can be an API request, although other request types are also possible.

In response to the received request, the method 700 proceeds to process block 704, where the client service sends a request to the DSS for current schema associated with the item or entity. The request can be received at an interface of the DSS, such as network interface 118 of DSS computing device 102. As discussed in detail above, the request to the DSS can be an API request, although other request types are also possible. In response to the received request, the DSS can prepare the schema, for example, as described above with respect to FIG. 2. At process block 706, the DSS returns the compiled schema for the requested item or entity, the compiled schema also including any constraints or other meta-data defined for the schema field. At decision block 708, the method 700 diverges based on the nature of the original client request at process block 702.

If the request received by the client service at process block 702 is to view item or entity data, the method 700 can proceed to process block 710, where the client service retrieves data according to the compiled schema from the DSS. For example, the service module 114 of client service computing device 106 can retrieve data stored in database 116 for each of the data fields specified by the schema and associated with the requested item or entity. The schema and/or the individual fields contained therein include constraints and/or presentation properties that define the layout of data fields on the display or report. Such presentation properties (also referred to as display rules or display properties) can include, but are not limited to, a field label to be displayed, help text, order for individual fields, and placement of individual fields. The method 700 proceeds to process block 712, where the retrieved data for the fields are arranged for displaying or reporting to the requesting client service user according to the constraints and/or presentation properties.

In some embodiments, a schema may be updated to delete a previously-existing schema field in the DSS. Data may thus already be stored by the client service according to the previous schema version. At process block 710, when the client service retrieves data according to the modified schema from the DSS, the client service may recognize that the data entry was created with a prior version of the schema that included an extra field. The client service can optionally retrieve the extra data field and display along with the other fields of the schema. Alternatively, the client service can ignore the extra stored data field and instead just display those data fields currently part of the schema from the DSS.

Figure 8A:
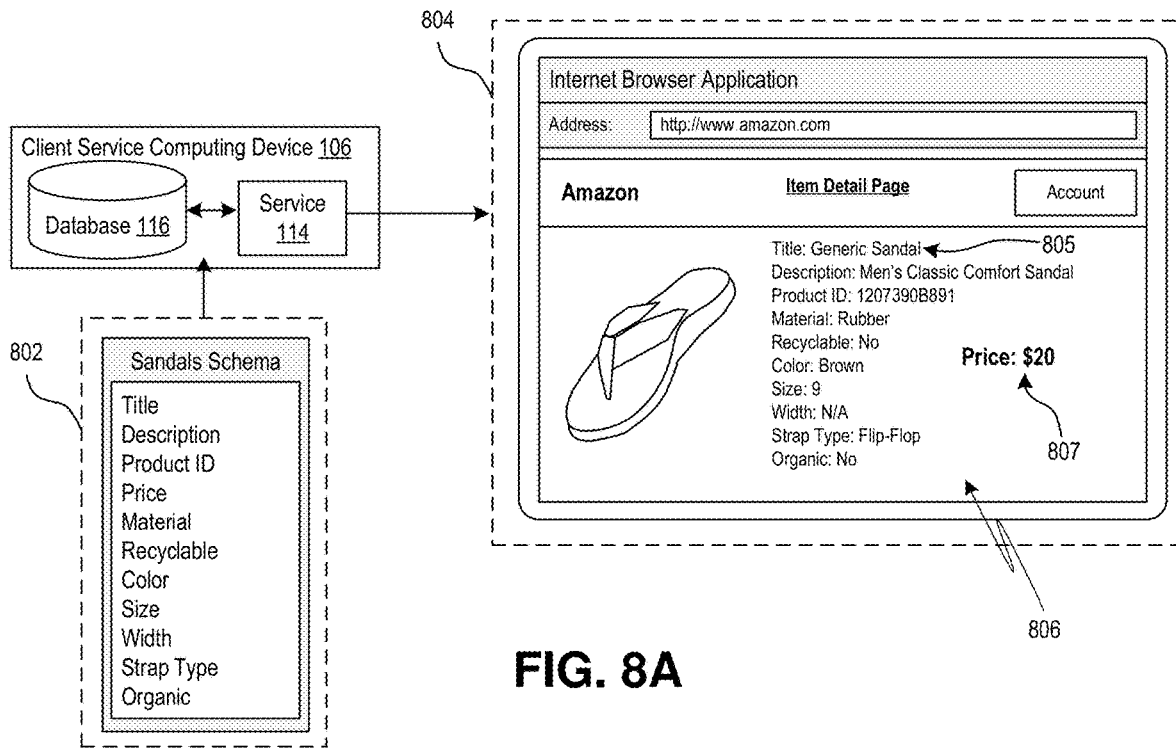
FIG. 8A shows an exemplary display operation by a client service using schema from a dynamic schema service.

FIG. 8A shows an exemplary display operation by a client service computing device 106 using schema 802 vended by the DSS. A client service user 110 sends a request to client service computing device 106 to display a product detail page for a particular sandal. In response to the user request, the client service computing device 106 sends a request to the DSS computing device, which returns the requested schema 802, including data fields and constraints, corresponding to the entity (e.g., sandals category). In some embodiments, the client service computing device 106 converts the requested product into one or more identifiers that specify the desired vertex or node that correspond to the product in one of the hierarchical graphs stored by the DSS. Alternatively, in some embodiments, the DSS is capable of converting the request and selecting the appropriate graph and vertex, for example, based on a correspondence chart stored by the DSS.

The client service module 114 uses the schema 802 to retrieve the corresponding data for each field for the particular sandal from database 116. The client service module 114 then generates the requested display page 804 with schema fields populated with the corresponding data, with the arrangement and appearance of the displayed fields 806 being dictated by the constraints and/or presentation properties defined in the schema from the DSS. For example, the schema from the DSS can specify that the Title field 805 is always displayed at the top of the details page and that the Price field 807 is displayed offset to the right of other fields and in a larger bold font, as shown in FIG. 8A. In some embodiments, the client service module 114 may include logic that allows for less than all of schema fields vended by the DSS to be displayed on display page 804 and/or to define a layout that does not otherwise conflict the with constraints and/or presentation properties defined in the schema from the DSS. For example, the client service module 114 can refrain from displaying the Product ID field on the display page 804 if not otherwise required by the schema constraints and presentation properties.

Returning to FIG. 7, if the request received by the client service at process block 702 is to add data, the method 700 proceeds from decision block 708 to process block 714, where the client service provides fields from the vended schema for data input by the client service user. For example, the service module 114 of client service computing device 106 can generate a website display via which a user can enter data into respective fields. Again, the schema and/or the individual fields contained therein include constraints and/or presentation properties that define the layout of data fields on the display. Such presentation properties can include, but are not limited to, a field label to be displayed, help text, order for individual fields, and placement of individual fields.

If the request received by the client service at process block 702 is to change data or after process block 714, the method 700 proceeds to process block 716, where the input of new or changed data is received at the client service from the client user. The method 700 proceeds to process block 718, where the data input is validated against the constraints and other meta-data associated with the schema. For example, service module 114 of client service computing device 106 can employ a validator, such as AJV, to confirm that the data input does not violate the constraints defined in the JSON object of the compiled schema from the DSS computing device 102. Alternatively or additionally, validation module 126 can interact with the client service computing device 106 to perform validation, with or without receiving any of the data input by the client service user. If any of the data input by the client service user is determined to be invalid at decision block 720, the method proceeds to process block 722, where an error message is generated for the client service user (e.g., by the client service computing device 106). Otherwise, the method 700 proceeds to process block 724, where the data input by the client service user is stored by the client service, for example, in database 116.

Figure 8B:
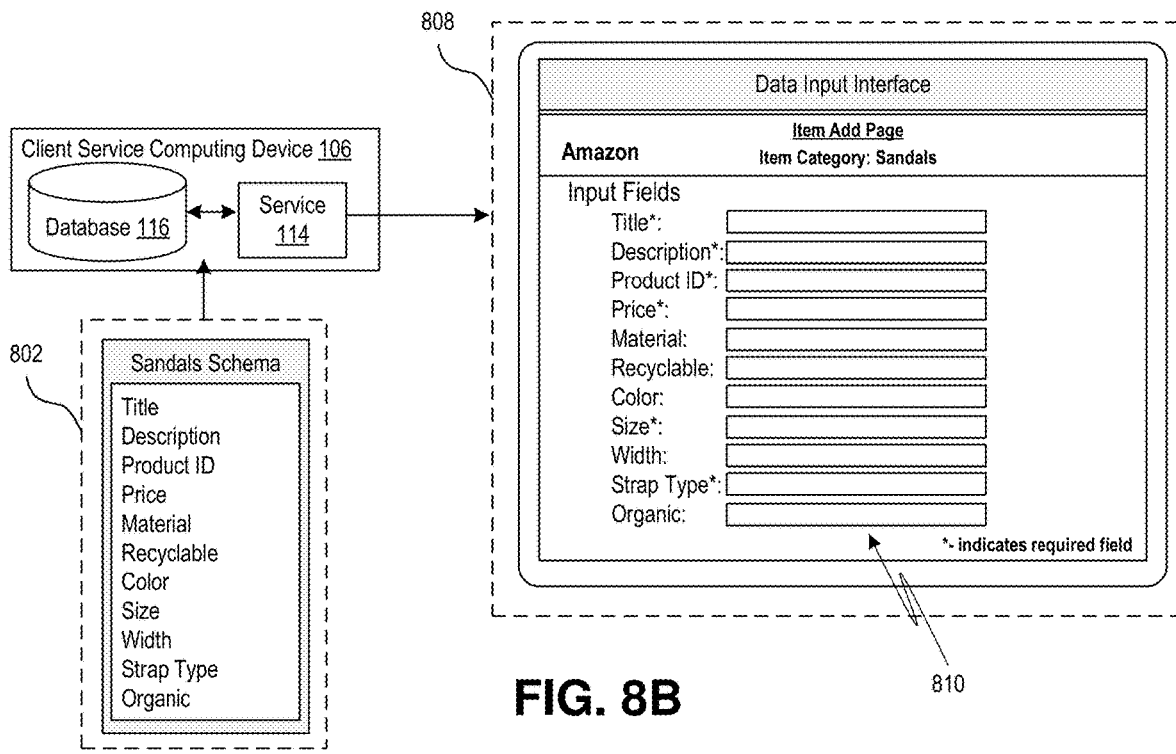
FIG. 8B shows an exemplary data input operation by a client service using schema from a dynamic schema service.

FIG. 8B shows an exemplary data input operation by a client service computing device 106 using schema 802 vended by the DSS. A client service user 110 sends a request to client service computing device 106 to list a new sandal for sale on the e-commerce marketplace of the client service. In response to the user request, the client service computing device 106 sends a request to the DSS computing device, which returns the requested schema 802, including data fields and constraints, corresponding to the entity (e.g., sandals category). In some embodiments, the client service computing device 106 converts the requested product into one or more identifiers that specify the desired vertex or node that correspond to the product in one of the hierarchical graphs stored by the DSS. Alternatively, in some embodiments, the DSS is capable of converting the request and selecting the appropriate graph and vertex, for example, based on a correspondence chart stored by the DSS.

The client service module 114 uses the schema 802 to populate a data input interface 808 with fields for data entry by the client service user in order to add the new sandal for sale. In the illustrated example, the fields are simultaneously displayed, but it is also possible for the fields to be sequentially displayed (e.g., a single field at a time, with progression to the next field depending on successful validation of data entry for the current field). The arrangement and appearance of the displayed input fields 810 is dictated by the constraints and/or presentation properties defined in the schema from the DSS. The constraints in the schema from the DSS can also define which data input fields are required. Validation of the data can occur in real-time (e.g., at the conclusion of data entry into a particular field, when proceeding to the next field) or once data has been input for all fields 810 (e.g., by clicking a submit button of the user interface 808). Upon successful validation, the data input for the new sandal is stored by client service computing device 106 in database 116, and the new sandal is subsequently offered for sale by the e-commerce marketplace.

Figure 9:
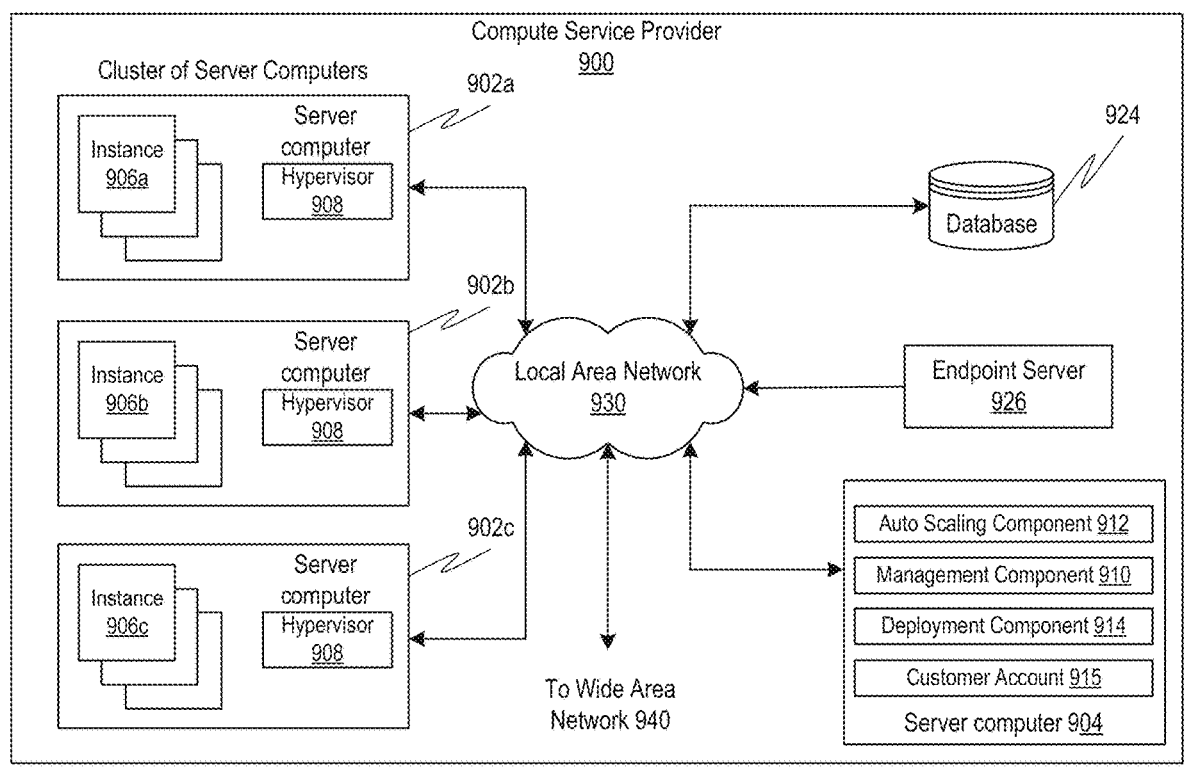
FIG. 9 is a simplified schematic diagram of an exemplary multi-tenant environment for a dynamic schema service, according to one or more embodiments of the disclosed subject matter.

FIG. 9 is a computing system diagram of a network-based compute service provider 900 that illustrates an environment in which embodiments described herein can be used. By way of background, the compute service provider 900 (e.g., a cloud provider) is capable of delivery of computing and storage capacity as a service to a community of end recipients. In an example embodiment, the compute service provider 900 is established for an organization by or on behalf of the organization, for example, as a "private cloud environment." In another embodiment, the compute service provider 900 supports a multi-tenant environment, wherein a plurality of customers operates independently (i.e., a public cloud environment). Generally speaking, the compute service provider 900 can provide the following models: Infrastructure as a Service ("IaaS"), Platform as a Service ("PaaS"), and/or Software as a Service ("SaaS"). Other models can be provided. For the IaaS model, the compute service provider 900 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 900 using networked client devices, such as desktop computers, laptops, tablets, smartphones, etc. running web browsers or other lightweight client applications. Those skilled in the art will recognize that the compute service provider 900 can be described as a "cloud" environment.

The particular illustrated compute service provider 900 includes a plurality of server computers 902a-902d. While only four server computers are shown, any number can be used, and large centers can include thousands of server computers. The server computers 902a-902d can provide computing resources for executing software instances 906a-906d. In one embodiment, the instances 906a-906d are virtual machines. As known in the art, a virtual machine is an instance of a software implementation of a machine (i.e., a computer) that executes applications like a physical machine. In the example of virtual machines, each of the servers 902a-902d can be configured to execute a hypervisor 908 or another type of program (e.g., container or container engine) configured to enable the execution of multiple instances 906 on a single server. Additionally, each of the instances 906 can be configured to execute one or more applications.

It should be appreciated that although the description above focuses on the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 904 are reserved for executing software components for managing the operation of the server computers 902 and the instances 906. For example, the server computer 904 executes a management component 910. A customer (e.g., an owner/operator of the DSS, an owner/operator of a client service, etc.) accesses the management component 910 to configure various aspects of the operation of the instances 906 purchased by the customer. For example, the customer purchases, rents or leases instances and makes changes to the configuration of the instances. The customer also specifies settings regarding how the purchased instances are to be scaled in response to demand. An auto-scaling component 912 scales the instances 906 based upon rules defined by the customer. In one embodiment, the auto-scaling component 912 allows a customer to specify scale-up rules for use in determining when new instances should be instantiated and scale-down rules for use in determining when existing instances should be terminated. The auto scaling component 912 can consist of a number of subcomponents executing on different server computers 902 or other computing devices. The auto-scaling component 912 can monitor available computing resources over an internal management network and modify resources available based on need.

A deployment component 914 is used to assist customers in the deployment of new instances 906 of computing resources. The deployment component has access to account information associated with the instances, such as who is the owner of the account, credit card information, country of the owner, etc. The deployment component 914 receives a configuration from a customer that includes data describing how new instances 906 should be configured. For example, the configuration specifies one or more applications to be installed in new instances 906, provides scripts and/or other types of code to be executed for configuring new instances 906, provides cache logic specifying how an application cache should be prepared, and other types of information. The deployment component 914 utilizes the customer-provided configuration and cache logic to configure, prime, and launch new instances 906. The configuration, cache logic, and other information is specified by a customer using the management component 910 or by providing this information directly to the deployment component 914. The instance manager can be considered part of the deployment component.

Customer account information 915 includes any desired information associated with a customer of the multi-tenant environment. For example, the customer account information includes a unique identifier for a customer, a customer address, billing information, licensing information, customization parameters for launching instances, scheduling information, auto-scaling parameters, previous IP addresses used to access the account, etc.

Each client device communicates with the DSS server computer 902d through endpoint 926, which can be a domain name system (DNS) address designed to receive and process API requests. In particular, the endpoint 926 can be a web server configured to expose an API. Using the API requests, a client device (e.g., external client(s) via wide area network 940) can make requests to implement any of the functionality described herein. Other services (e.g., instances 906a-906c), which can be internal to the compute service provider 900, can likewise make API requests to the endpoint 926.

The network 930 is utilized to interconnect the server computers 902a-902c, the server computer 904, the database server 924, the DSS server 902d, and the endpoint service 926. Database server 924 includes a data store for information regarding client service schema (e.g., hierarchical graphs). The network 930 can be a local area network (LAN) and can be connected to a Wide Area Network (WAN) 940 so that end users can access the compute service provider 900. Alternatively or additionally, an external client (e.g., server computer external to compute service provider 900) interacts with the DSS service 902d via a request to endpoint 926 over networks 930, 940. It should be appreciated that the network topology illustrated in FIG. 9 has been simplified and that many more networks and networking devices can be utilized to interconnect the various computing systems disclosed herein.

Figure 10:
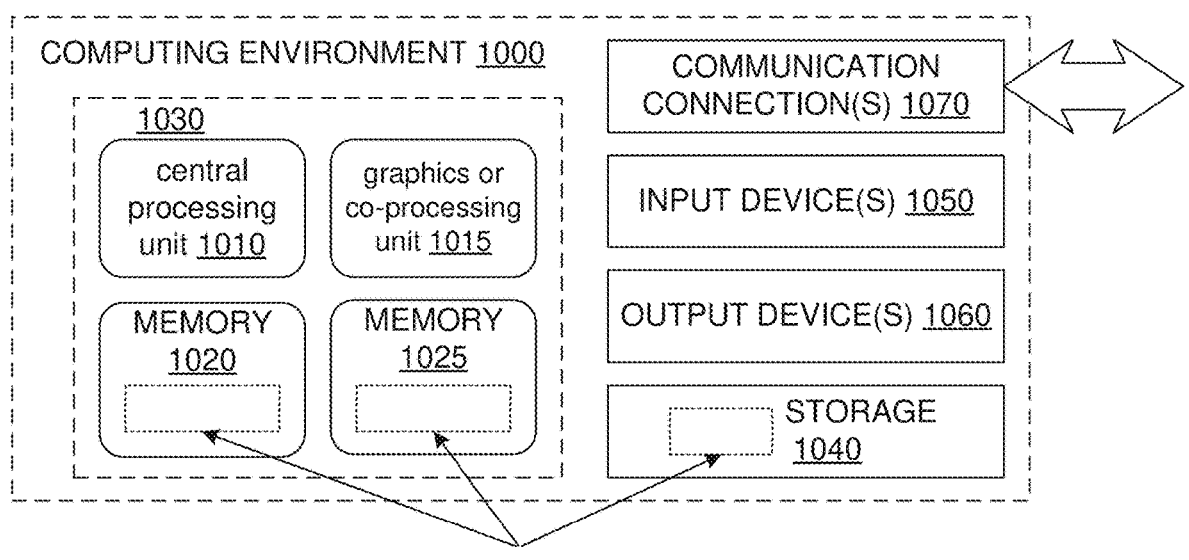
FIG. 10 is a simplified schematic diagram depicting a generalized example of a computing environment in which the disclosed technologies may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.). In some embodiments, the computing environment is within a marketplace operator, for example, to provide or support an e-commerce marketplace service. Alternatively, in some embodiments, the computing environment is within an enterprise system of an organization, for example, to provide or support a project management service. In some embodiments, the computing environment can be a cloud-based environment.

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way, and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above described examples and embodiments, provision of a request, indication, instruction, or any other communication between systems, components, devices, modules, marketplaces, sites, networks, etc. can be by generation and transmission of an appropriate electrical signal by wired or wireless connections.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are only examples of the disclosed technology and should not be taken as limiting the scope of the invention. We therefore claim as our invention all that comes within the scope of these claims.

What is claimed is:

1. A computer-implemented method, comprising:
   storing, for a client service, a hierarchical graph and corresponding meta-schema and constraints, the hierarchical graph comprising a plurality of levels and a plurality of vertices interconnected by edges, each vertex being associated with one of the levels and corresponding to a respective entity, at least one data field being defined for each vertex;
   receiving, at the client service, a client request related to a first entity;
   receiving, at a dynamic schema service, a first service request from the client service for a first schema associated with the first entity, the first entity corresponding to a first vertex in the stored hierarchical graph;
   building the first schema associated with the first entity by aggregating the data fields defined for each vertex in the levels higher than the first vertex and connected to the first vertex, with the at least one data field defined for the first vertex; and
   at the client service, using the first schema associated with the first entity and the corresponding constraints from the dynamic schema service to satisfy the client request.

2. The computer-implemented method of claim 1, further comprising:
   receiving, at the dynamic schema service, a second service request to modify a second schema associated with a second entity, the second entity corresponding to a second vertex in the stored hierarchical graph, the modification comprising changing a data field defined for the second vertex, deleting a data field defined for the second vertex, defining a new data field for the second vertex, or any combination thereof;
   using the meta-schema corresponding to the hierarchical graph, determining that the requested modification is valid, wherein the meta-schema comprises one or more definitions of valid field types, required field properties, valid field properties, conditional constraints, or any combination thereof; and
   in response to the determining that the requested modification is valid, performing the modification on the second vertex in the stored hierarchical graph.

3. The computer-implemented method of claim 2, wherein the second vertex is at a level in the stored hierarchical graph higher than the first vertex, the receiving the first service request is after the receiving the second service request, and the built first schema inherits the modifications made to the second vertex.

4. The computer-implemented method of claim 2, further comprising, in response to the determining that the requested modification is valid, storing the hierarchical graph resulting from the modification as a new version, and storing the hierarchical graph prior to the modification as a prior version.

5. The computer-implemented method of claim 1, wherein the client request is to store data for the first entity, and the using the first schema at the client service comprises:
   receiving data input for fields of the first schema for the first entity;
   using the constraints, determining that the data input for the first entity is valid; and
   in response to the determining that the data input is valid, storing the data for the first entity.

6. The computer-implemented method of claim 1, wherein the client request is to display stored data for the first entity, the constraints include one or more display properties, and the using the first schema at the client service comprises:
   determining an arrangement for display of the data fields of the first schema based at least in part on the one or more display properties; and
   displaying the data fields populated with corresponding stored data for the first entity according to the determined arrangement.

7. The computer-implemented method of claim 1, wherein the first service request is received at an application program interface (API) of the dynamic schema service, and the first service request is an API request.

8. One or more non-transitory computer-readable storage media collectively storing computer-executable instructions that, when executed by one or more computing devices, configure the one or more computing devices to collectively perform operations comprising:
   receiving a request for modification of a first schema based on a hierarchical graph structure having a plurality of levels and a plurality of vertices interconnected by edges, each vertex being associated with one of the levels, at least one field being defined for each vertex, the modification comprising changing a field in the first schema, deleting a field in the first schema, defining a new field in the first schema, or any combination thereof;
determining that the requested modification is valid using meta-schema associated with the hierarchical graph structure, the meta-schema comprising one or more definitions of valid field types, required field properties, valid field properties, conditional constraints, or any combination thereof; and
in response to the determining that the requested modification is valid, performing the requested modification of the first schema.

9. The one or more non-transitory computer-readable storage media of claim 8, wherein each definition of the meta-schema is written in JSON Schema.

10. The one or more non-transitory computer-readable storage media of claim 8, wherein the storage media collectively store additional computer-executable instructions that, when executed by the one or more computing devices, configure the one or more computing devices to collectively perform further operations in response to the determining that the requested modification is valid, the further operations comprising:
labeling the first schema prior to the requested modification as a prior version and the modified first schema resulting from the requested modification as a current version.

11. The one or more non-transitory computer-readable storage media of claim 8, wherein the storage media collectively store additional computer-executable instructions that, when executed by the one or more computing devices, configure the one or more computing devices to collectively perform further operations, the further operations comprising:
receiving a request for the first schema;
sending the first schema; and
determining that data input according to the first schema is valid based at least in part on constraints stored for the first schema.

12. The one or more non-transitory computer-readable storage media of claim 11, wherein the storage media collectively store additional computer-executable instructions that, when executed by the one or more computing devices, configure the one or more computing devices to collectively build the requested first schema by aggregating fields defined for each vertex in levels higher than a first vertex and connected to the first vertex with fields defined for the first vertex.

13. The one or more non-transitory computer-readable storage media of claim 11, wherein the sent first schema includes one or more display properties for fields of the first schema.

14. A dynamic schema system comprising:
a first database storing at least one hierarchy for determining a schema, each hierarchy having at least one level and at least one node, each node being associated with one of the levels, at least one data field being defined for each node;
one or more processors; and
at least one data storage device coupled to the one or more processors,
wherein the at least one data storage device stores program instructions executable by the one or more processors to:
in response to a request from a client for a first schema:
retrieve, from the first database, a first hierarchy from the at least one hierarchy that is associated with the client;
determine fields for the first schema based on the retrieved hierarchy; and
send the determined fields for the first schema to the client.

15. The dynamic schema system of claim 14, wherein the first database comprises a graph database, and each hierarchy comprises a hierarchical graph.

16. The dynamic schema system of claim 14, wherein the at least one data storage device stores program instructions executable by the one or more processors to determine fields for the first schema by aggregating the fields defined for a node associated with the requested first schema and the fields defined for each node in levels higher than the node associated with the first schema.

17. The dynamic schema system of claim 14, wherein the at least one data storage device stores further program instructions executable by the one or more processors to validate data input for the fields of the first schema.

18. The dynamic schema system of claim 14, wherein:
the first database stores a plurality of meta-schema or the dynamic schema system comprises a second database that stores the plurality of meta-schema;
each hierarchy in the first database is associated with one of the stored meta-schema; and
the meta-schema comprises one or more definitions of valid field types, required field properties, valid field properties, conditional constraints, or any combination thereof.

19. The dynamic schema system of claim 18, wherein more than one hierarchy in the first database is associated with a same one of the plurality of meta-schema.

20. The dynamic schema system of claim 18, wherein the at least one data storage device stores further program instructions executable by the one or more processors to:
in response to a request to modify the first schema, determine that the requested modification is valid based on the stored meta-schema;
retrieve, from the first database, the first hierarchy; and
in response to determining that the requested modification is valid:
store the retrieved first hierarchy as a prior version in the first database;
alter the first hierarchy based on the requested modification; and
store the altered first hierarchy as a current version in the first database.

* * * * *